United States Patent
Kim

(10) Patent No.: US 11,223,817 B2
(45) Date of Patent: Jan. 11, 2022

(54) DUAL STEREOSCOPIC IMAGE DISPLAY APPARATUS AND METHOD

(71) Applicant: ELECTRONICS AND TELECOMMUNICATIONS RESEARCH INSTITUTE, Daejeon (KR)

(72) Inventor: Do-Hyung Kim, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/572,223

(22) Filed: Sep. 16, 2019

(65) Prior Publication Data
US 2020/0154096 A1 May 14, 2020

(30) Foreign Application Priority Data

Nov. 12, 2018 (KR) .................. 10-2018-0138494
Apr. 30, 2019 (KR) .................. 10-2019-0050738

(51) Int. Cl.

| | |
|---|---|
| *G02B 30/10* | (2020.01) |
| *H04N 13/106* | (2018.01) |
| *H04N 13/349* | (2018.01) |
| *H04N 13/282* | (2018.01) |
| *H04N 13/229* | (2018.01) |
| *H04N 13/161* | (2018.01) |
| *G02B 30/27* | (2020.01) |

(52) U.S. Cl.
CPC ......... *H04N 13/282* (2018.05); *H04N 13/161* (2018.05); *H04N 13/229* (2018.05); *G02B 30/27* (2020.01); *H04N 2213/001* (2013.01); *H04N 2213/008* (2013.01)

(58) Field of Classification Search
CPC .. H04N 13/282; H04N 13/229; H04N 13/161; H04N 2213/001; H04N 2213/008; G02B 30/27
See application file for complete search history.

(56) References Cited

U.S. PATENT DOCUMENTS 5,142,616 A * 8/1992 Kellas ................... G06T 11/001
 345/428
6,480,174 B1 * 11/2002 Kaufmann ......... G02B 27/0172
 345/7

(Continued)

FOREIGN PATENT DOCUMENTS

| KR | 1020130013492 A | 2/2013 |
|---|---|---|
| KR | 101498206 B1 | 3/2015 |
| KR | 1020160036745 A | 4/2016 |

*Primary Examiner* — Philip P. Dang

(57) ABSTRACT

Disclosed herein are dual stereoscopic image display apparatus and method. The dual stereoscopic image display method is performed by a dual stereoscopic image display apparatus, and includes separating a background image including a background and a foreground object image including a foreground object from multi-view stereoscopic image data, setting the background image so that the background image is output via a first display at a first resolution, and setting the foreground object image so that the foreground object image is output via a second display at a second resolution, and synchronizing the background image and the foreground object image into a single stereoscopic image via the first display and the second display, and outputting the stereoscopic image.

6 Claims, 14 Drawing Sheets

(56) References Cited

U.S. PATENT DOCUMENTS

| | | | | |
|---|---|---|---|---|
| 6,731,825 B1* | 5/2004 | Acampora | ............ | H04N 5/2224 345/630 |
| 7,196,722 B2* | 3/2007 | White | ................. | G11B 27/034 348/211.99 |
| 7,372,629 B2* | 5/2008 | Uehara | ................ | H04N 13/305 359/463 |
| 7,408,600 B2* | 8/2008 | Yata | .................... | H04N 13/305 349/75 |
| 8,115,698 B2* | 2/2012 | Azor | ....................... | G06F 21/84 345/1.1 |
| 8,213,711 B2* | 7/2012 | Tam | ..................... | H04N 13/261 382/162 |
| 8,368,766 B2* | 2/2013 | Zhou | ..................... | G06T 3/4038 348/208.6 |
| 8,411,932 B2* | 4/2013 | Liu | ..................... | H04N 13/128 382/154 |
| 8,422,801 B2 | 4/2013 | Newton et al. | | |
| 8,498,498 B2 | 7/2013 | Hwang et al. | | |
| 8,506,085 B2* | 8/2013 | Azor | ...................... | G03B 21/26 353/7 |
| 8,787,656 B2 | 7/2014 | Park et al. | | |
| 9,214,040 B2* | 12/2015 | Smolic | ................. | H04N 13/128 |
| 9,619,104 B2* | 4/2017 | Xin | ...................... | G06K 9/6201 |
| 9,651,729 B2* | 5/2017 | Nichol | ................ | G02B 6/0036 |
| 9,696,559 B2 | 7/2017 | Kim et al. | | |
| 9,824,431 B2* | 11/2017 | Kobayashi | .............. | G06T 11/60 |
| 10,298,907 B2* | 5/2019 | Chiu | .................. | G06F 3/04842 |
| 10,719,742 B2* | 7/2020 | Shechtman | ............ | G06N 3/088 |
| 10,748,313 B2* | 8/2020 | Holzer | ................. | H04N 13/111 |
| 10,839,577 B2* | 11/2020 | Horie | .................. | G06T 11/00 |
| 2013/0335684 A1* | 12/2013 | Yoshikawa | ............. | G06F 3/041 349/96 |
| 2015/0346969 A1* | 12/2015 | Strabbing | ........... | G06F 3/04845 715/723 |
| 2016/0026253 A1* | 1/2016 | Bradski | ................ | H04N 13/167 345/8 |
| 2017/0069071 A1 | 3/2017 | Jung | | |
| 2017/0244908 A1* | 8/2017 | Flack | .................. | G06K 9/00234 |
| 2018/0255290 A1* | 9/2018 | Holzer | ................. | H04N 13/279 |
| 2019/0110040 A1* | 4/2019 | Doyen | .................... | G06T 5/002 |
| 2019/0251401 A1* | 8/2019 | Shechtman | ............. | G06T 11/00 |

\* cited by examiner

DUAL STEREOSCOPIC IMAGE DISPLAY APPARATUS AND METHOD

CROSS REFERENCE TO RELATED APPLICATIONS

This application claims the benefit of Korean Patent Application Nos. 10-2018-0138494, filed Nov. 12, 2018 and 10-2019-0050738, filed Apr. 30, 2019, which are hereby incorporated by reference in their entireties into this application.

BACKGROUND OF THE INVENTION

1. Technical Field

The present invention relates generally to stereoscopic image display technology, and more particularly, to dual stereoscopic image display technology that overlaps two images with each other and outputs overlapping images.

2. Description of the Related Art

A stereoscopic television (TV) or the like uses a binocular-type display. FIGS. 1 to 3 are diagrams illustrating binocular stereoscopic image displays of a red-blue type, a polarizing type, and an electronic shutter type. It can be seen that the binocular-type display employs a scheme in which a left-eye image and a right-eye image are individually displayed. It can be seen that such binocular-type displays are classified into the red-blue type illustrated in FIG. 1, the polarizing type illustrated in FIG. 2, and the electronic shutter type illustrated in FIG. 3 depending on the method of providing images to users.

In order to increase user convenience and a stereoscopic effect, a stereoscopic image display has developed into a scheme in which several tens to several hundreds of view images are provided, as in the case of the multi-view imaging type illustrated in FIG. 4.

Also, as the multi-view imaging type, a lenticular type illustrated in FIGS. 5 and 6, a lens array type illustrated in FIG. 7, etc. are mainly used, and a tensor display type in which several Liquid Crystal Display (LCD) panels are stacked, as illustrated in FIGS. 8 to 10, has been developed.

Here, multi-view stereoscopic image data requires a large data storage space and a wide transmission bandwidth. However, in a portion corresponding to a background in multi-view stereoscopic image data, the difference between images depending on the visual field is not large, and only the difference between images in a portion corresponding to a foreground is large.

Also, a multi-view stereoscopic image display is problematic in that resolution is deteriorated because limited resolution is partitioned according to direction, so that only a portion of total resolution is used.

Meanwhile, Korean Patent Application Publication No. 10-2013-0013492 entitled "Display Apparatus For Displaying Three-Dimensional Picture And Driving Method For The Same" discloses a stereoscopic (3D) image display apparatus and a driving method thereof, which may extract a number of views corresponding to the number of panel views from a multi-view input image received from a broadcasting system, and may then form a stereoscopic image.

SUMMARY OF THE INVENTION

Accordingly, the present invention has been made keeping in mind the above problems occurring in the prior art, and an object of the present invention is to reduce a storage space and a transmission bandwidth for a multi-view stereoscopic image.

Another object of the present invention is to provide a multi-view stereoscopic image with a high image quality to a user by improving the resolution quality of the multi-view stereoscopic image.

In accordance with an aspect of the present invention to accomplish the above objects, there is provided a dual stereoscopic image display method performed by a dual stereoscopic image display apparatus, including separating a background image including a background and a foreground object image including a foreground object from multi-view stereoscopic image data; setting the background image so that the background image is output via a first display at a first resolution, and setting the foreground object image so that the foreground object image is output via a second display at a second resolution; and synchronizing the background image and the foreground object image into a single stereoscopic image via the first display and the second display, and outputting the stereoscopic image.

The first resolution may be a resolution that is higher than the second resolution by a preset value or more.

Separating the background image and the foreground object image may be configured to separate the foreground object image from the multi-view stereoscopic image data so that the foreground object image includes view images corresponding to at least two directions.

A number of directions of view images included in the background image may be less than a number of directions of the view images included in the foreground object image.

A panel display surface of the first display and a panel display surface of the second display may be arranged in a specific direction within a preset range.

A panel of the first display may be arranged at a location corresponding to any one of a front surface and a rear surface of the second display with respect to the panel display surface of the second display.

In accordance with an aspect of the present invention to accomplish the above objects, there is provided a dual stereoscopic image display apparatus, including one or more processors; and a memory for storing at least one program that is executed by the one or more processors, wherein the at least one program is configured to separate a background image including a background and a foreground object image including a foreground object from multi-view stereoscopic image data, set the background image so that the background image is output via a first display at a first resolution, and set the foreground object image so that the foreground object image is output via a second display at a second resolution, and synchronize the background image and the foreground object image into a single stereoscopic image via the first display and the second display, and output the stereoscopic image.

The first resolution may be a resolution that is higher than the second resolution by a preset value or more.

The at least one program may be configured to separate the foreground object image from the multi-view stereoscopic image data so that the foreground object image includes view images corresponding to at least two directions.

A number of directions of view images included in the background image may be less than a number of directions of the view images included in the foreground object image.

A panel display surface of the first display and a panel display surface of the second display may be arranged in a specific direction within a preset range.

A panel of the first display may be arranged at a location corresponding to any one of a front surface and a rear surface of the second display with respect to the panel display surface of the second display.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
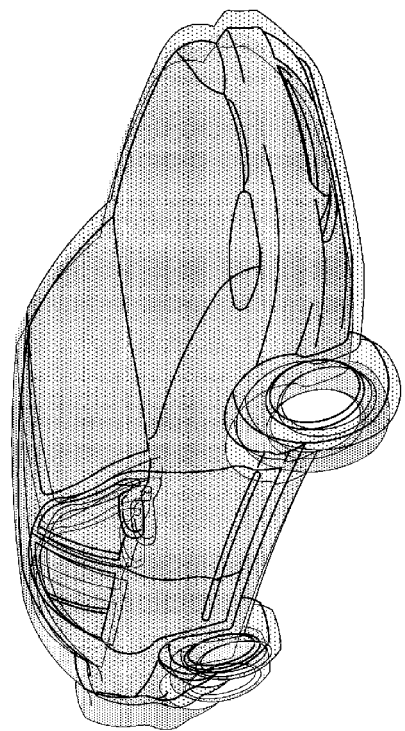
FIG. 1 is a diagram illustrating a binocular stereoscopic image display of a red-blue type.
Figure 1:
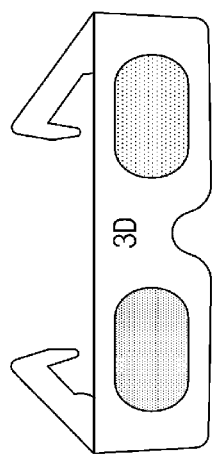
Figure 2:
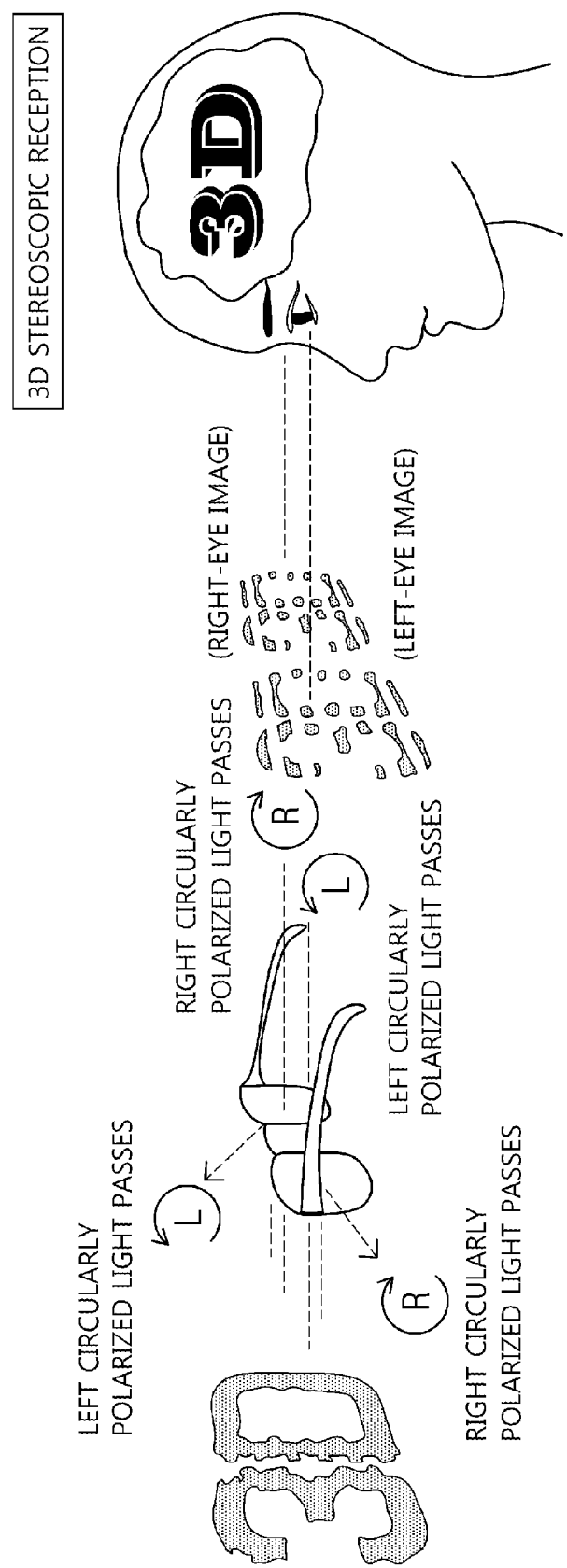
FIG. 2 is a diagram illustrating a binocular stereoscopic image display of a polarizing type.
Figure 3:
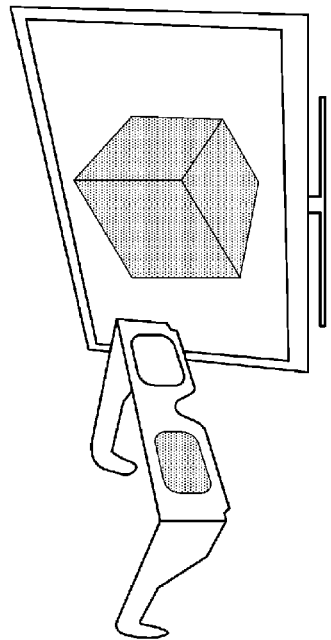
FIG. 3 is a diagram illustrating a binocular stereoscopic image display of an electronic shutter type.
Figure 3:
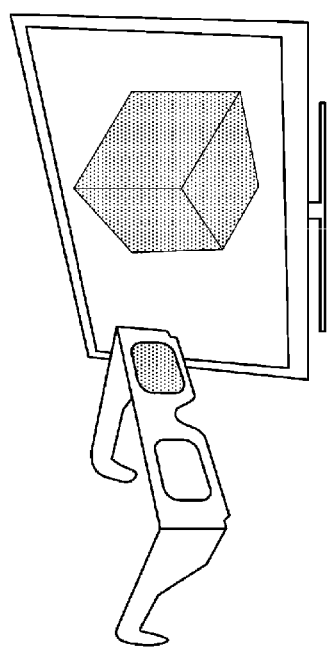
Figure 4:
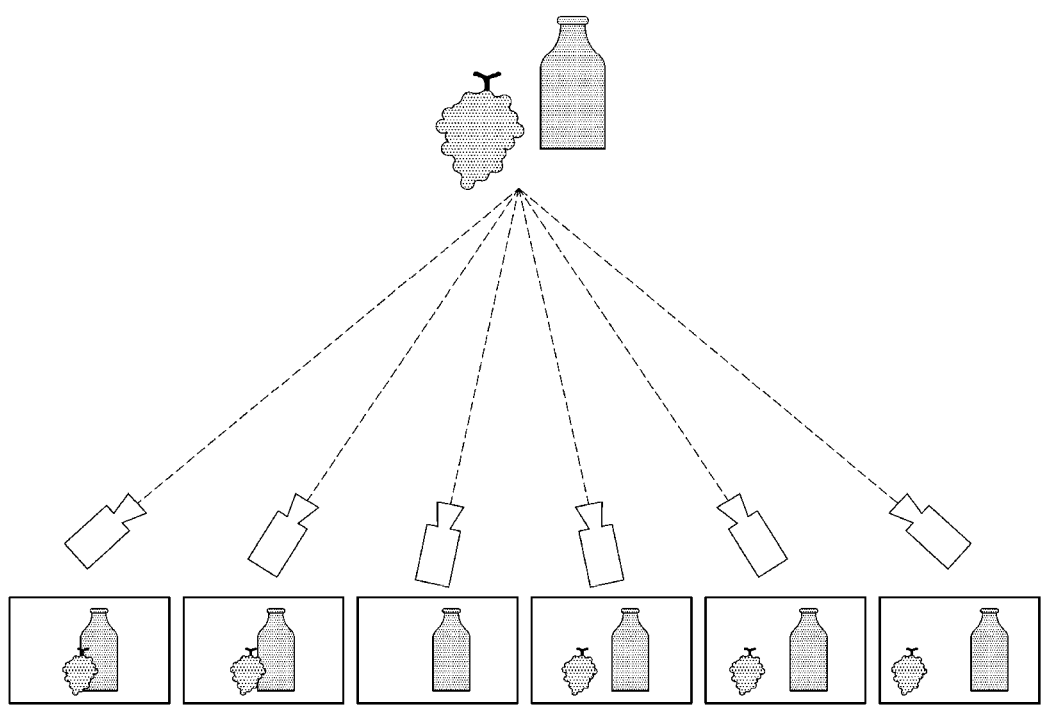
FIG. 4 is a diagram illustrating a multi-view imaging-based stereoscopic image display.
Figure 5:
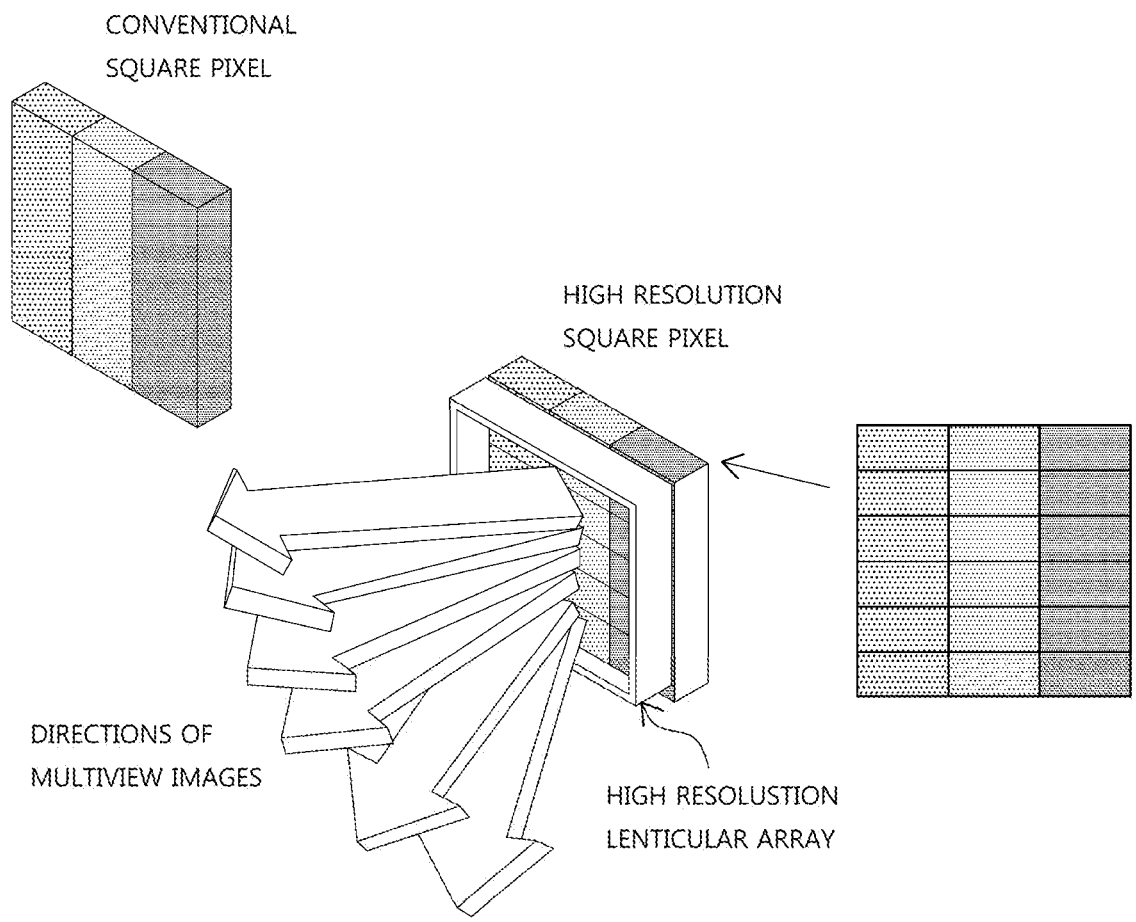
FIGS. 5 and 6 are diagrams illustrating a lenticular-based multi-view stereoscopic image display.
Figure 6:
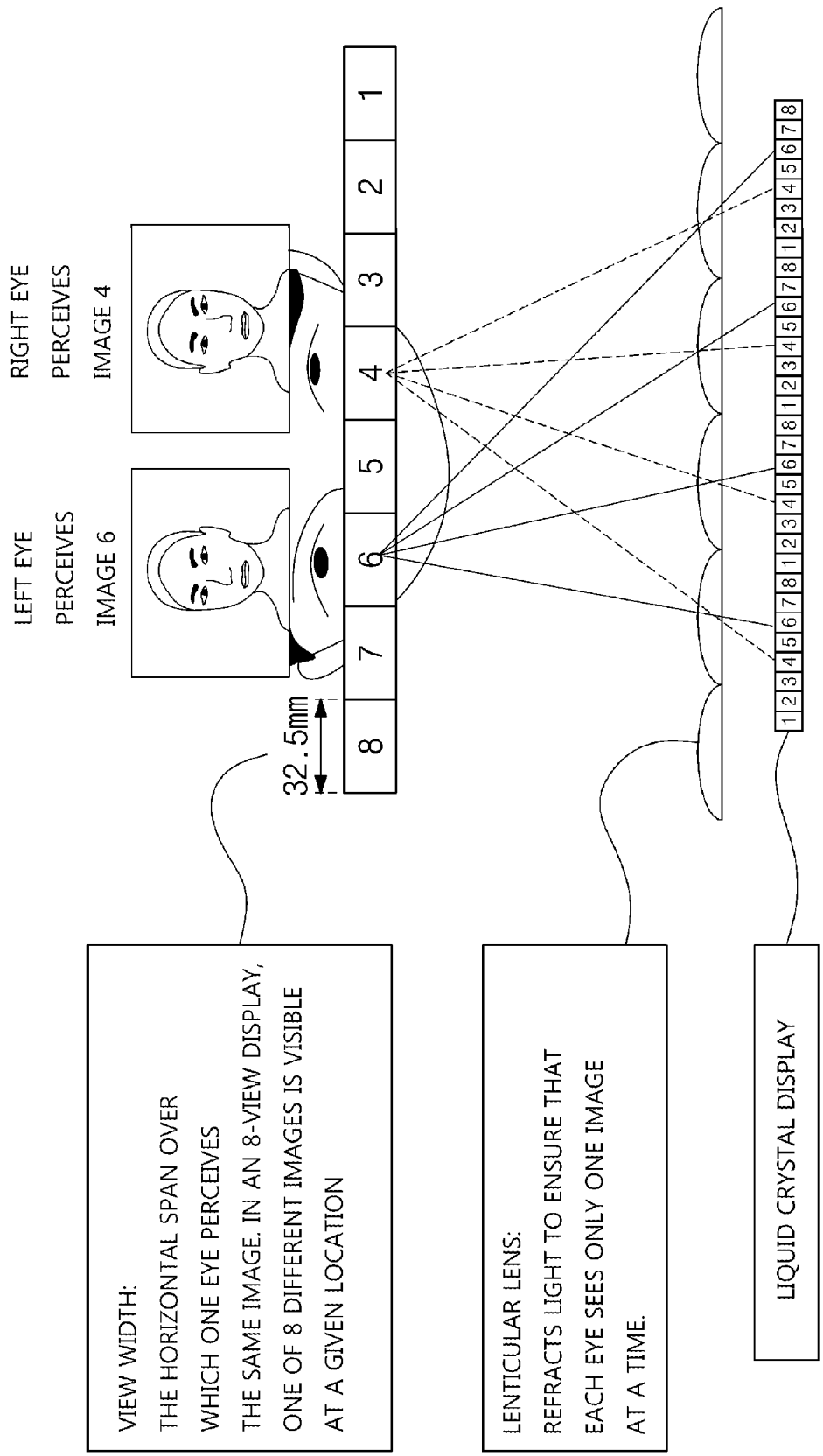
Figure 7:
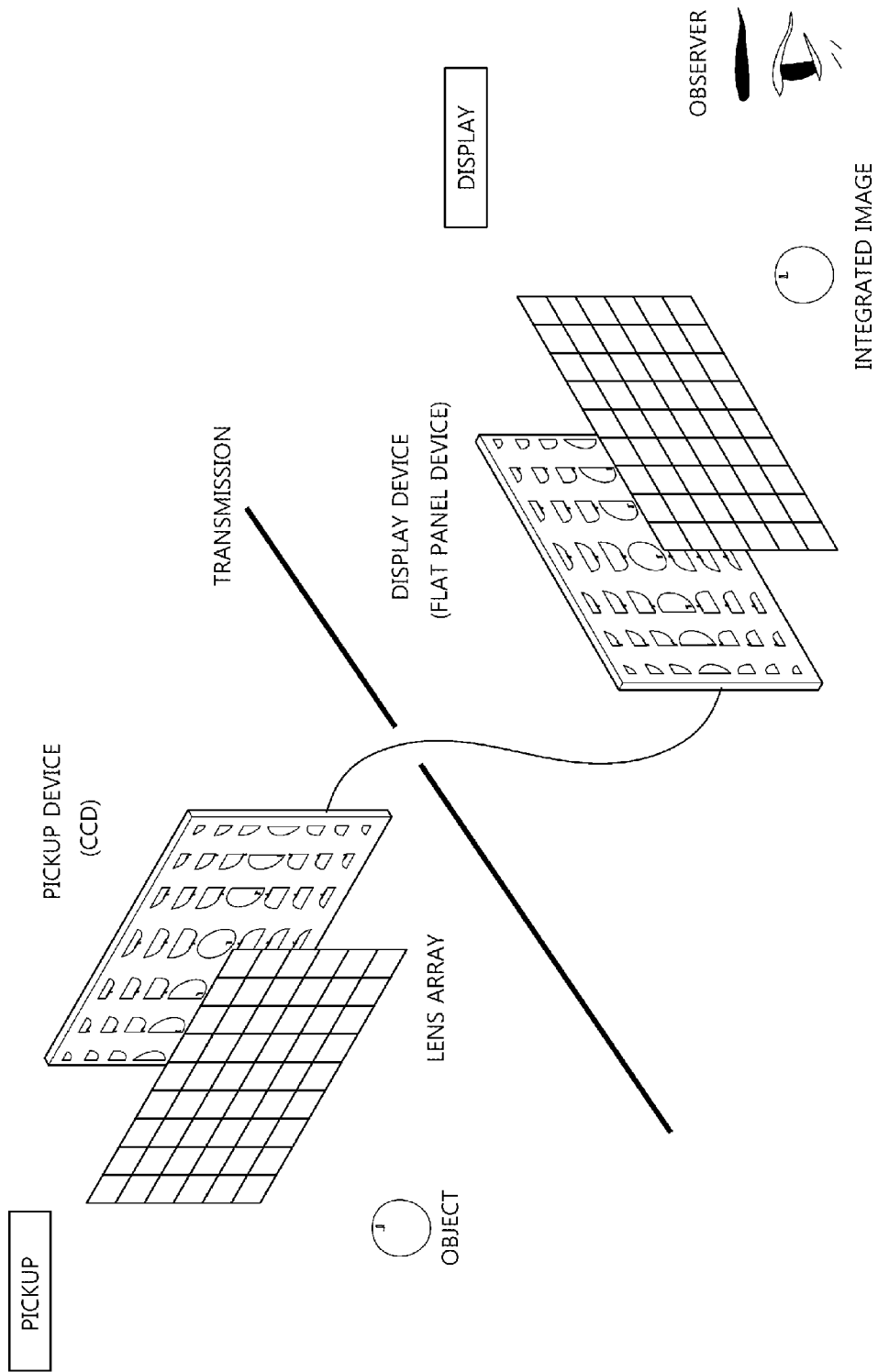
FIG. 7 is a diagram illustrating a lens array-based multi-view imaging-type stereoscopic image display.
Figure 8:
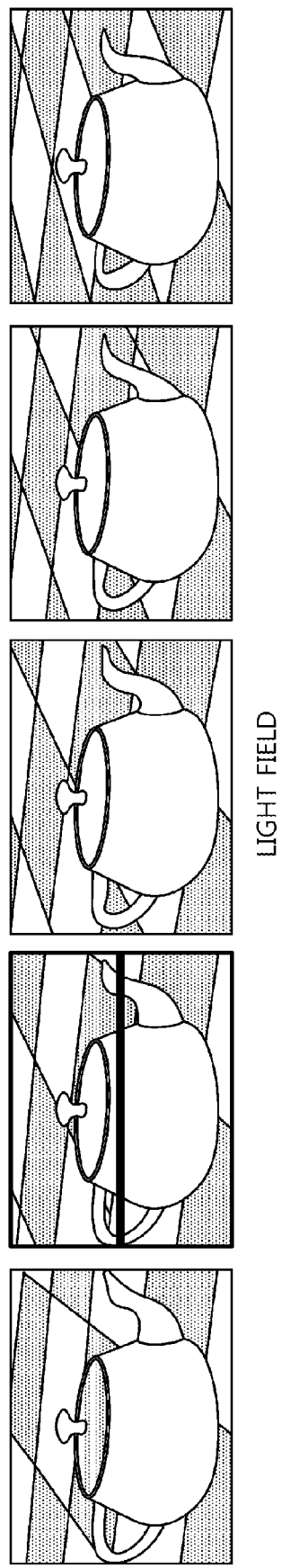
FIGS. 8 to 10 are diagrams illustrating a tensor display for stacking LCD panels and generating a stereoscopic image depending on the direction.
Figure 9:
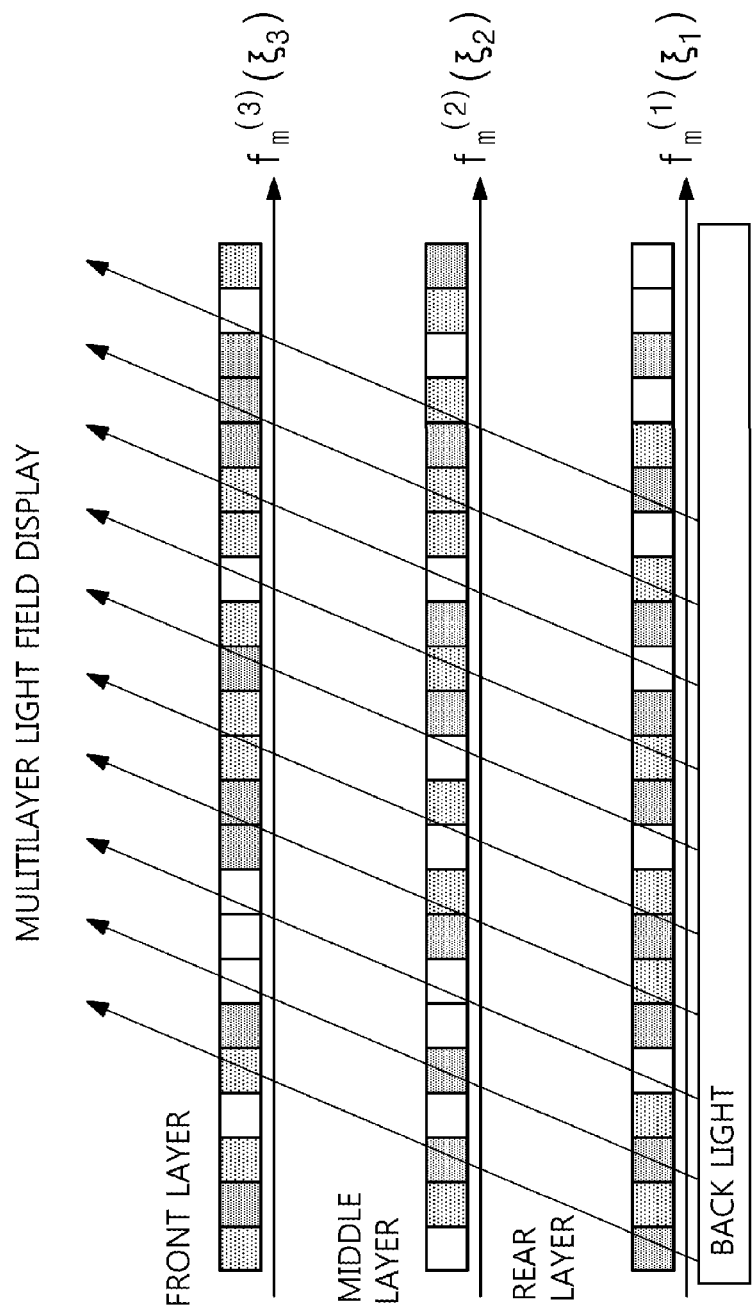
Figure 10:
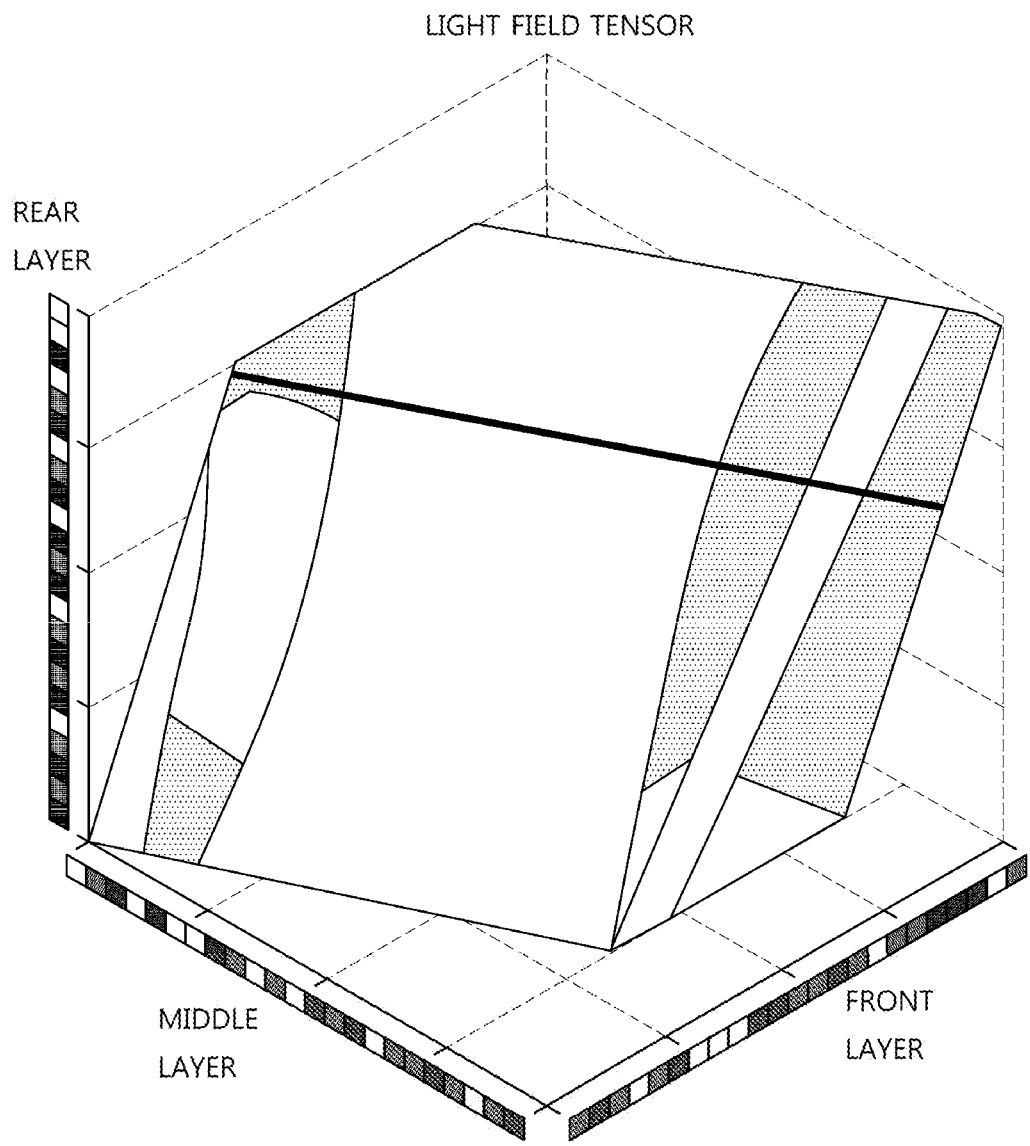

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the attached drawings.

Figure 11:
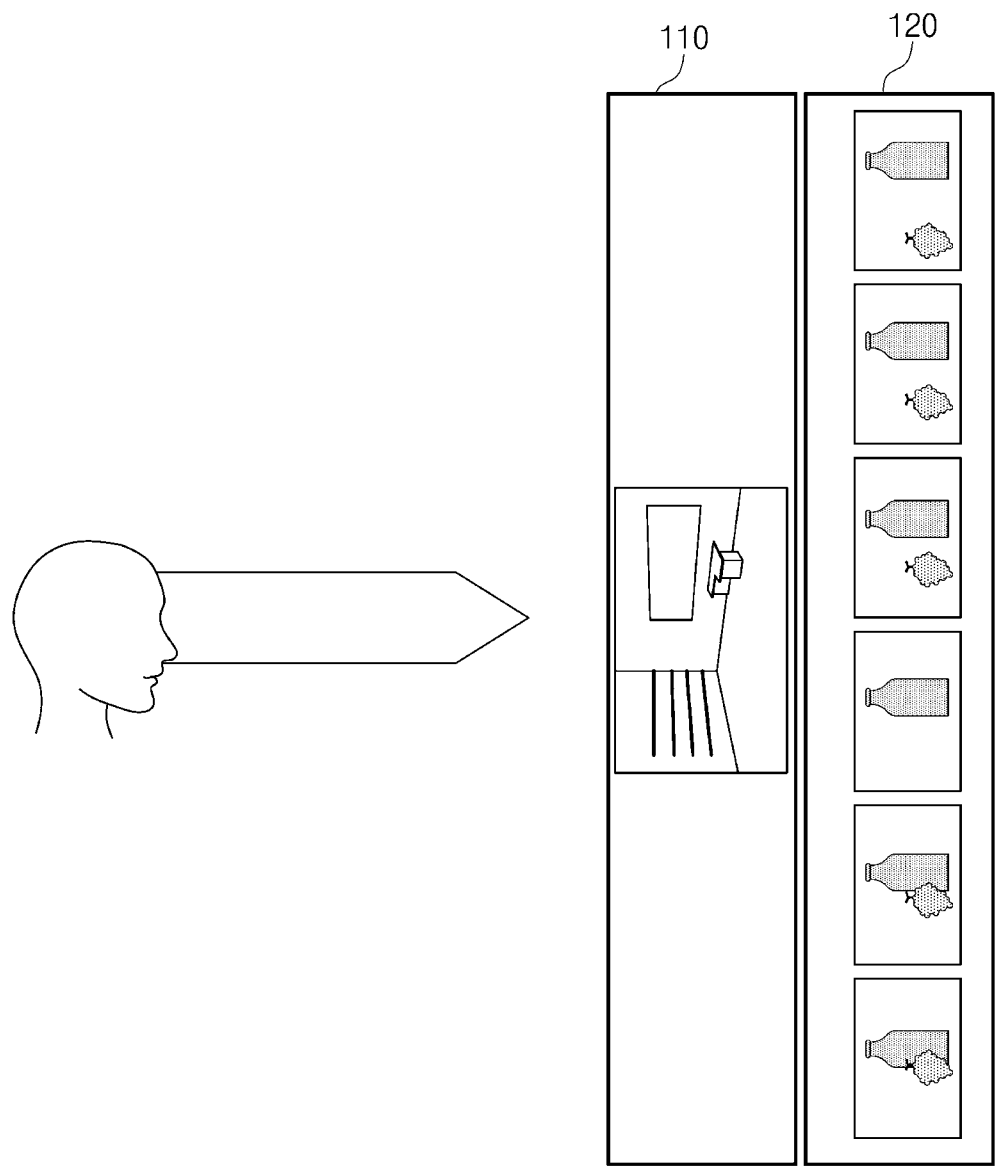
FIG. 11 is a diagram illustrating a dual stereoscopic image display apparatus according to an embodiment of the present invention.

FIG. 11 is a diagram illustrating a dual stereoscopic (three-dimensional: 3D) image display apparatus according to an embodiment of the present invention.

Referring to FIG. 11, it can be seen that the dual stereoscopic image display apparatus according to an embodiment of the present invention may provide a multi-view stereoscopic image to a user using a first display unit 110 and a second display unit 120.

The dual stereoscopic image display apparatus may independently visualize a multi-view stereoscopic image by varying pieces of direction information for a background and a foreground using two or more overlapping displays.

The first display unit 110 may display (output) a background image, which may provide less direction information than that of a foreground object image, or may provide no direction information.

Here, the background image provides a smaller number of directional view images than the foreground object image, but may be reproduced on a visualization panel having a higher resolution.

The second display unit 120 may display (output) the foreground object image, which may provide more direction information than the background image, and may provide information about two or more directions.

In this case, the foreground object image may provide a larger number of directional view images than the background image, but may be reproduced on a visualization panel having a lower resolution. The user may ultimately perceive images combined with each other on the two visualization panels.

The display panel of the first display unit 110 for providing a high-resolution background image may be a panel which autonomously generates an image, as in the case of an LCD, or may be a semitransparent screen which reflects an image projected from a separate projector.

Also, when the second display unit 110 for providing a low-resolution foreground object image is a lenticular type or a lens array type, the display panel of the second display unit 120 may be located behind the display panel of the first display unit 110 with respect to the direction of the user.

However, the display apparatus of the present invention is not limited thereto, and the display panel of the second display unit 120 may be located in front of the display panel of the first display unit 110 depending on the type of panel.

For example, the dual stereoscopic image display apparatus according to an embodiment of the present invention may set a background image so that the background image is provided as a single high-resolution view image, and may set a foreground object image so that the foreground object image is provided as multiple low-resolution view images.

By means of this, unnecessary view images in the background image may be removed, so that storage and transmission space may be efficiently utilized. Also, even if the foreground object image is provided at a low resolution, multiple view images may be provided as the foreground object image, thus allowing the user to experience a foreground object image that appears to have a high resolution.

Figure 12:
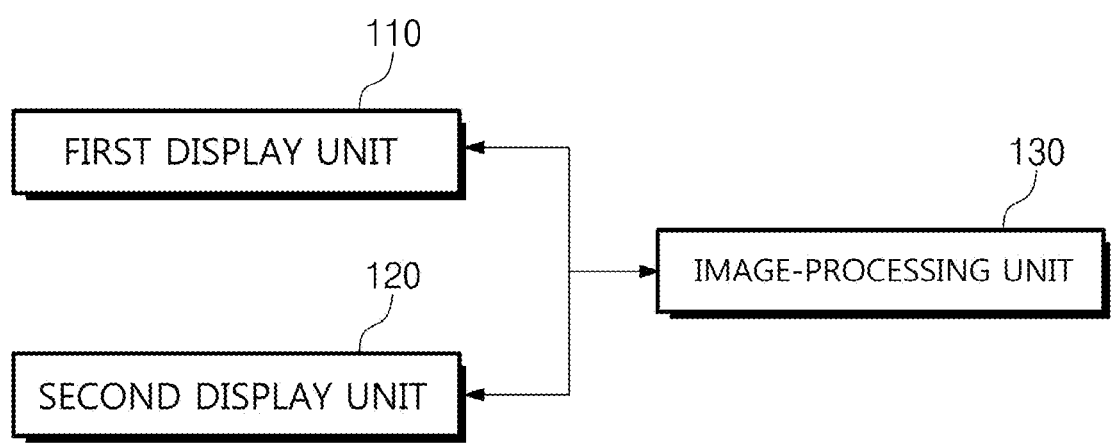
FIG. 12 is a block diagram illustrating a dual stereoscopic image display apparatus according to an embodiment of the present invention.

FIG. 12 is a block diagram illustrating a dual stereoscopic image display apparatus according to an embodiment of the present invention.

Referring to FIG. 12, the dual stereoscopic image display apparatus according to an embodiment of the present invention may include a first display unit 110, a second display unit 120, and an image-processing unit 130.

The first display unit 110 may output a background image.

The second display unit 120 may output a foreground object image.

The image-processing unit 130 may separate a background image including a background and a foreground object image including a foreground object from multi-view stereoscopic image data.

Here, the image-processing unit 130 may separate the foreground object image from the multi-view stereoscopic image data so that the foreground object image includes view images corresponding to at least two directions.

The number of directions of view images included in the background image may be less than the number of directions of the view images included in the foreground object image.

The image-processing unit 130 may set the background image so that the background image is output via the first display unit 110 at a first resolution.

The image-processing unit 130 may set the foreground object image so that the foreground object image is output via the second display unit 120 at a second resolution.

The first resolution may be a resolution that is higher than the second resolution by a preset value or more.

Also, the image-processing unit 130 may synchronize the background image and the foreground object image into a single stereoscopic image via the first display unit 110 and the second display unit 120, and may output the single stereoscopic image.

Here, the panel display surface of the first display unit 110 and the panel display surface of the second display unit 120 may be arranged in a specific direction within a preset range.

Here, the panel of the first display unit 110 may be arranged at a location corresponding to any one of a front surface and a rear surface of the second display unit 120 with respect to the panel display surface of the second display unit 120.

For example, the image-processing unit 130 may set the background image so that the background image is provided as a single high-resolution view image, and may set the foreground object image so that the foreground object image is provided as multiple low-resolution view images.

By means of this, unnecessary view images in the background image may be removed, so that a storage and transmission space may be efficiently utilized. Also, even if the foreground object image is provided at a low resolution, multiple view images may be provided as the foreground object image, thus allowing the user to experience a foreground object image that appears to have a high resolution.

Figure 13:
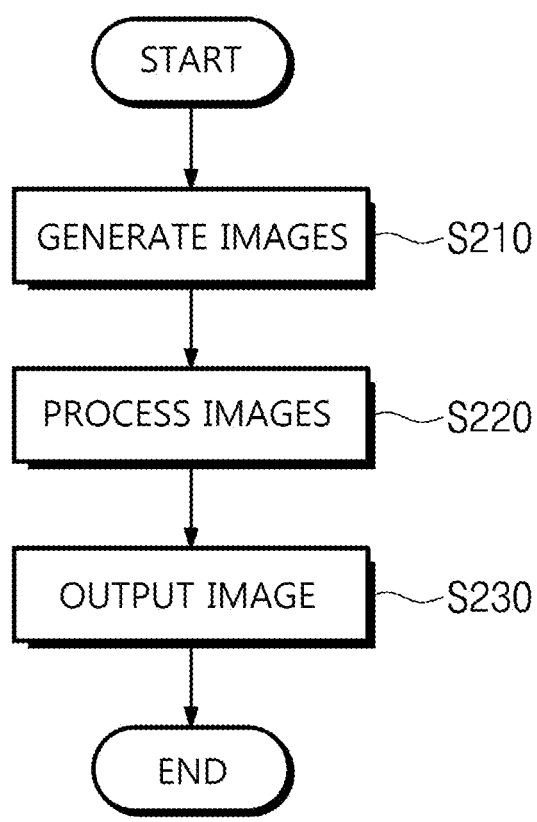
FIG. 13 is an operation flowchart illustrating a dual stereoscopic image display method according to an embodiment of the present invention.

FIG. 13 is an operation flowchart illustrating a dual stereoscopic image display method according to an embodiment of the present invention.

Referring to FIG. 13, in the dual stereoscopic image display method according to the embodiment of the present invention, a background image and a foreground object image may be generated at step S210.

That is, at step S210, a background image including a background and a foreground object image including a foreground object may be separated from multi-view stereoscopic image data.

At step S210, the foreground object image may be separated from the multi-view stereoscopic image data so that the foreground object image includes view images corresponding to at least two directions.

The number of directions of view images included in the background image may be less than the number of directions of the view images included in the foreground object image.

Further, in the dual stereoscopic image display method according to the embodiment of the present invention, settings and synchronization for outputting (displaying) the background image and the foreground object image may be performed at step S220.

At step S220, the background image may be set so that the background image is output via the first display unit 110 at a first resolution.

Here, at step S220, the foreground object image may be set so that the foreground object image is output via the second display unit 120 at a second resolution.

The first resolution may be a resolution that is higher than the second resolution by a preset value or more.

Next, in the dual stereoscopic image display method according to the embodiment of the present invention, a multi-view stereoscopic image may be output via the first display unit 110 and the second display unit 120 at step S230.

That is, at step S230, the background image and the foreground object image may be synchronized into a single stereoscopic image via the first display unit 110 and the second display unit 120, and then the single stereoscopic image may be output.

Here, the panel display surface of the first display unit 110 and the panel display surface of the second display unit 120 may be arranged in a specific direction within a preset range.

Here, the panel of the first display unit 110 may be arranged at a location corresponding to any one of a front surface and a rear surface of the second display unit 120 with respect to the panel display surface of the second display unit 120.

For example, the dual stereoscopic image display method according to the embodiment of the present invention may set the background image so that the background image is provided as a single high-resolution view image, and may set the foreground object image so that the foreground object image is provided as multiple low-resolution view images.

By means of this, unnecessary view images in the background image may be removed, so that storage and transmission space may be efficiently utilized. Also, even if the foreground object image is provided at a low resolution, multiple view images may be provided as the foreground object image, thus allowing the user to experience a foreground object image that appears to have a high resolution.

Figure 14:
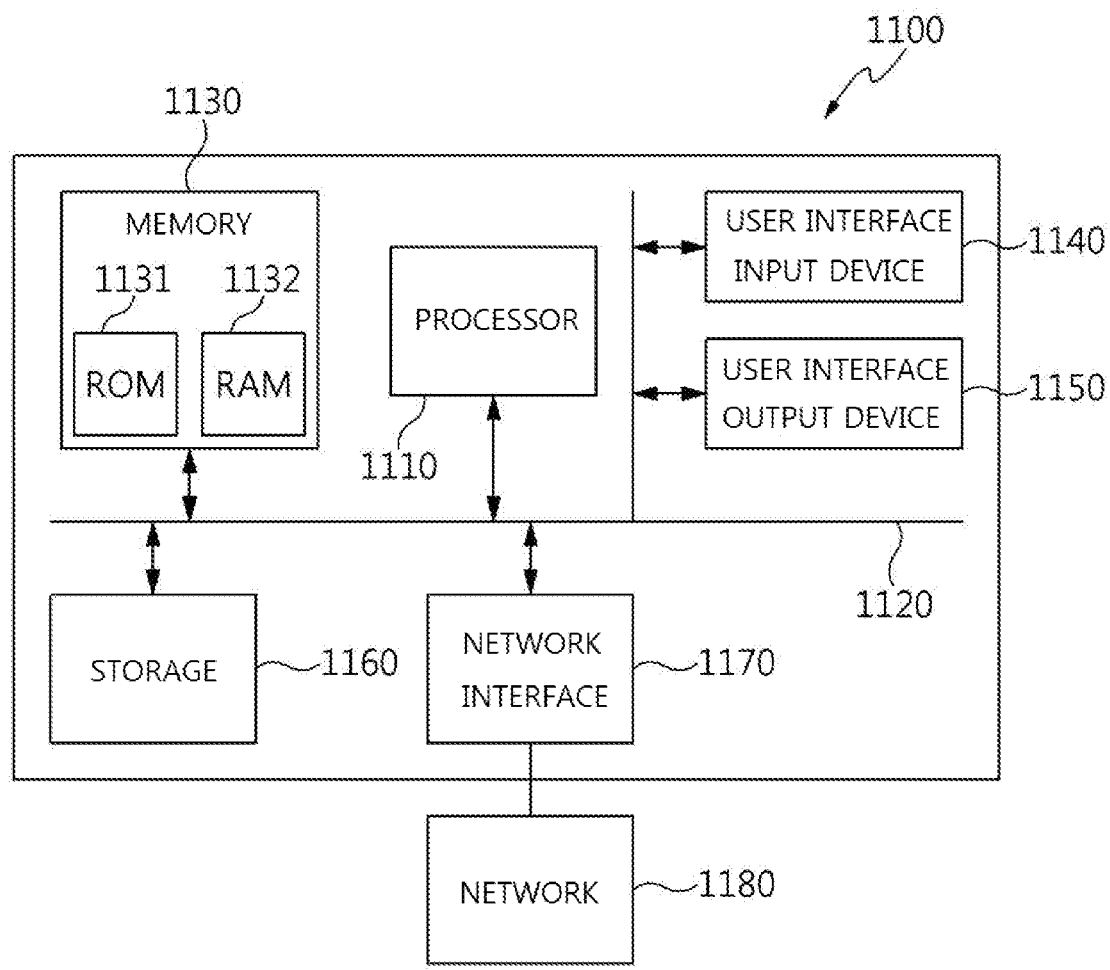
FIG. 14 is a diagram illustrating a computer system according to an embodiment of the present invention.

FIG. 14 is diagram illustrating a computer system according to an embodiment of the present invention.

Referring to FIG. 14, a dual stereoscopic image display apparatus according to an embodiment of the present invention may be implemented in a computer system 1100 such as a computer-readable storage medium. As illustrated in FIG. 14, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Here, the one or more processors 1110 may be included in the first display unit 110, the second display unit 120, and the image-processing unit 130, and may perform the functions of the first display unit 110, the second display unit 120, and the image-processing unit 130 using at least one program.

Here, the dual stereoscopic image display apparatus according to the embodiment of the present invention may include one or more processors 1110 and memory 1130 for storing at least one program executed by the one or more processors 1110, wherein the at least one program may separate a background image including a background and a foreground object image including a foreground object from multi-view stereoscopic image data, set the background image so that the background image is output via the first display unit 110 at a first resolution, set the foreground object image so that the foreground object image is output via the second display unit 120 at a second resolution, and output a single stereoscopic image by synchronizing the background image and the foreground object image into the single stereoscopic image via the first display unit 110 and the second display unit 120.

Here, the first resolution may be a resolution that is higher than the second resolution by a preset value or more.

Here, the foreground object image may be separated from the multi-view stereoscopic image data so that the foreground object image includes view images corresponding to at least two directions.

Here, the number of directions of the view images included in the background image may be less than the number of directions of the view images included in the foreground object image.

Here, the panel display surface of the first display unit 110 and the panel display surface of the second display unit 120 may be arranged in a specific direction within a preset range.

Here, the panel of the first display unit 110 may be arranged at a location corresponding to any one of a front surface and a rear surface of the second display unit 120 with respect to the panel display surface of the second display unit 120.

For example, the dual stereoscopic image display apparatus according to the embodiment of the present invention may set the background image so that the background image is provided as a single high-resolution view image, and may set the foreground object image so that the foreground object image is provided as multiple low-resolution view images.

By means of this, unnecessary view images in the background image may be removed, so that storage and transmission space may be efficiently utilized. Also, even if the foreground object image is provided at a low resolution, multiple view images may be provided as the foreground object image, thus allowing the user to experience a foreground object image that appears to have a high resolution.

The present invention may reduce storage space and transmission bandwidth for a multi-view stereoscopic image.

Further, the present invention may provide a multi-view stereoscopic image with high image quality to a user by improving the resolution quality of the multi-view stereoscopic image.

As described above, in the dual stereoscopic image display apparatus and method according to the present invention, the configurations and schemes in the above-described embodiments are not limitedly applied, and some or all of the above embodiments can be selectively combined and configured such that various modifications are possible.

What is claimed is:

1. A dual stereoscopic image display method performed by a dual stereoscopic image display apparatus, comprising:
    separating a background image including a background and a plurality of foreground object images including a foreground object from multi-view stereoscopic image data;
    setting the background image so that the background image is output via a first display at a first resolution, and setting the plurality of foreground object images so that the plurality of foreground object images are output via a second display at a second resolution that is lower than the first resolution; and
    synchronizing the background image and the plurality of foreground object images into a single stereoscopic image via the first display and the second display, and outputting the stereoscopic image,
    wherein the synchronizing the background image is configured to set the background image so that the background image is provided as a single high-resolution view image, and set the plurality of foreground object images so that the plurality of foreground object images are provided as multiple low-resolution view images,
    wherein separating the background image and the plurality of foreground object images comprises separating the plurality of foreground object images from the multi-view stereoscopic image data so that the plurality of foreground object images include view images corresponding to at least two directions, and
    wherein a number of directions of view images included in the background image is less than a number of directions of the view images included in the plurality of foreground object images.

2. The dual stereoscopic image display method of claim 1, wherein a panel display surface of the first display and a panel display surface of the second display are arranged in a specific direction within a preset range.

3. The dual stereoscopic image display method of claim 2, wherein a panel of the first display is arranged at a location corresponding to any one of a front surface and a rear surface of the second display with respect to the panel display surface of the second display.

4. A dual stereoscopic image display apparatus, comprising:
    one or more processors; and
    a memory for storing at least one program that is executed by the one or more processors,
    wherein the at least one program is configured to:
    separate a background image including a background and a plurality of foreground object images including a foreground object from multi-view stereoscopic image data,
    set the background image so that the background image is output via a first display at a first resolution, and set the plurality of foreground object images so that the plurality of foreground object images are output via a second display at a second resolution that is lower than the first resolution, and
    synchronize the background image and the plurality of foreground object images into a single stereoscopic image via the first display and the second display, and output the stereoscopic image,
    wherein the at least one program is configured to set the background image so that the background image is provided as a single high-resolution view image, and set the plurality of foreground object images so that the plurality of foreground object images are provided as multiple low-resolution view images,
    wherein the at least one program is configured to separate the plurality of foreground object image from the multi-view stereoscopic image data so that the plurality of foreground object image includes view images corresponding to at least two directions, and
    wherein a number of directions of view images included in the background image is less than a number of directions of the view images included in the plurality of foreground object images.

5. The dual stereoscopic image display apparatus of claim 4, wherein a panel display surface of the first display and a panel display surface of the second display are arranged in a specific direction within a preset range.

6. The dual stereoscopic image display apparatus of claim 5, wherein a panel of the first display is arranged at a location corresponding to any one of a front surface and a rear surface of the second display with respect to the panel display surface of the second display.

\* \* \* \* \*